United States Patent [19]

Richter

[11] Patent Number: 5,647,463
[45] Date of Patent: Jul. 15, 1997

[54] AXLE FOR TRACK-BOUND ELECTRICAL TOY VEHICLES, PARTICULARLY RAILROAD VEHICLES

[75] Inventor: Wolfgang Richter, Nuremberg, Germany

[73] Assignee: Ernst Paul Lehmann Patentwerk, Nuremberg, Germany

[21] Appl. No.: 521,164

[22] Filed: Aug. 30, 1995

[30] Foreign Application Priority Data

Sep. 7, 1994 [DE] Germany .................. 9414473.7 U

[51] Int. Cl.⁶ .................................................. B60L 5/00
[52] U.S. Cl. .................. 191/45 R; 295/36.1; 246/255; 105/157.2
[58] Field of Search .................. 191/45 R; 246/255; 105/157.2; 295/36.1

[56] References Cited

U.S. PATENT DOCUMENTS

| | | | |
|---|---|---|---|
| 567,540 | 9/1896 | Grassler | 191/45 R |
| 1,383,037 | 6/1921 | Studstill | 191/45 R |
| 1,813,560 | 7/1931 | Browne et al. | 246/255 |
| 2,079,525 | 5/1937 | Place | 246/255 |
| 2,636,087 | 4/1953 | Bonanno | 105/157.2 |
| 5,373,791 | 12/1994 | Bach et al. | 246/255 |

*Primary Examiner*—Mark T. Le
*Attorney, Agent, or Firm*—Jordan and Hamburg

[57] ABSTRACT

An axle for track-bound electrical toy vehicles, particularly railroad vehicles, with an axle shaft which consists preferably of a synthetic material and to the end of which current-drawing wheel rims are rotatably disposed by means of ball bearings, the wheel bearings being slipped onto slip-on sections formed on the axle shaft, metallic plug contact pins being disposed at the axle shaft, which are connected in an electrically conducting manner with the ball bearings and protrude preferably radially for drawing current from the axle shaft.

19 Claims, 1 Drawing Sheet

AXLE FOR TRACK-BOUND ELECTRICAL TOY VEHICLES, PARTICULARLY RAILROAD VEHICLES

BACKGROUND OF THE INVENTION

The invention relates to an axle for track-bound electrical toy vehicles, particularly railroad vehicles, with an axle shaft, which consists preferably of a synthetic material and to the end of which current-drawing wheel rims are rotatably disposed by means of ball bearings, the wheel bearings being slipped onto slip-on sections formed on the axle shaft.

For track-bound toy vehicles, current is drawn for the electric motor driving the vehicle over the wheel rims, which collect the current from the rails. In order to connect the wheel rims electrically with the electric motor, the previously known axles have connecting cables, which are disposed on the axle and lead to the electric motor. These connecting cables are connected electrically conductive and more or less permanently, for example, by soldering or wedging, with the ball bearings and are glued at least partially to the axle shaft, so that they can be taken jointly to the electric motor. Aside from the inadequate fastening of the wires to the ball bearings as well as to the axle shaft itself, which leads to detachment and separation when subjected to slight mechanical stresses, a further disadvantage can be seen therein that it is troublesome to lead the connecting wires to the electric motor. Furthermore, a universal use of the axle is not possible, since a simple taking apart for removing the cables and, with that, for converting the current-collecting axle into a normal axle is not possible.

SUMMARY OF THE INVENTION

It is therefore an object of the invention to configure an axle of the initially mentioned type in such a manner, that the drawing of current from the axle and the connection with the electric driving motor are simplified while, at the same time, the axle can be used in multifunctional ways.

To accomplish this objective, provisions are made pursuant to the invention for an axle with the aforementioned distinguishing features that metallic plug contact pins are disposed at the axle shaft, which are connected in an electrically conducting manner with the ball bearings and protrude preferably radially for collecting current from the axle shaft. By mounting the plug contact pins, which protrude only a short distance from the axle shaft, simple contacting is thus made possible merely by plugging it into the corresponding socket. Likewise, the axle can also be used as a conventional axis, since, instead of the previously disadvantageous complete cabling, only the plug contact pins are provided, which do not interfere even when the axle is used normally. At the same time, it has proven to be advantageous that, pursuant to the invention, the plug contact pins essentially have an L shape, one leg running essentially parallel to the axis of the ball bearing and the other forming the radially protruding contacting part. The plug contact pin and the leg parallel to the axis furthermore can be disposed to contact the ball bearing directly. However, it has proven to be extremely advantageous for achieving a permanent contact having a low resistance, if the plug contact pin is guided pursuant to the invention as far as into the slip-on section in such a manner, that the slipped-on ball bearing overlaps is in a contacting manner. For the exact guidance and fixation of the plug contact pin, the letter can be guided in a groove formed at the axle shaft and/or optionally at the slip-on section.

For the further improvement of the contact between the plug contact pin and the ball bearing, provisions can furthermore be made within the scope of the invention that the leg section, guided in the groove formed in the slip-on section, is shaped in such a manner, that its upper side, while making possible a positive fit when the ball bearing is slipped on, is integrated into the slip-on section, the upper side of the leg section being shaped pursuant to the invention to correspond to the curvature of the slip-on section, so that the contact surface is enlarged further by these means. Furthermore, the free end of the leg parallel to the axis can preferably be mounted elastically, pursuant to the invention, in the groove, so that the contact is improved by these means for positive locking by means of the contacting pressure of the spring.

For securely fixing is to the axle shaft and/or the slip-on section and optionally in the groove, the contact pin can be disposed nondetachably thereon pursuant to the invention. For this purpose, preferably gluing or, optionally, injection molding directly in to the plastic axle shaft has proven to be appropriate. Alternatively to this and to enable the axle to be disassembled for the purpose of removing the plug contact pin, a holding ring, which holds the plug contact pin by wedging it, can be provided pursuant to the invention. This holding ring can be slipped on detachably onto the optionally elongated slip-on section and overlaps the plug contact pin at the leg parallel to the axis and fixes it. At the same time, the length of the holding ring is, of course, such that the leg, parallel to the axis, is overlapped only a short way and sufficient length of leg is still present for contacting the ball bearing. In order to fix the contact pin securely, it has proven to be advantageous to provide for the holding ring a second slip-on section of larger diameter adjoining the first slip-on section.

Since an appropriate axial force is acting while the wheel rims as well as the holding rings are being slipped onto the plug contact pin, on the basis of which axial pressure displacement parallel to the axis is possible, projections can furthermore be provided at the axle shaft in a further development of the invention, which projections preferably can be provided with a groove guiding the protruding leg and do support the legs of the plug contact pins, which protrude from the axle shaft, against the pressure acting during the slipping on of the wheel rims and/or optionally of the holding rings. By means of the projections and optionally of the grooves, the plug contact pin is thus securely fixed, so that it remains in its position during the slipping on as well as during the pulling off.

Further advantages, distinguishing features and details of the invention arise out of the example described in the following and out of the accompanying drawings.

DESCRIPTION OF THE PREFERRED EMBODIMENTS

Figure 1:
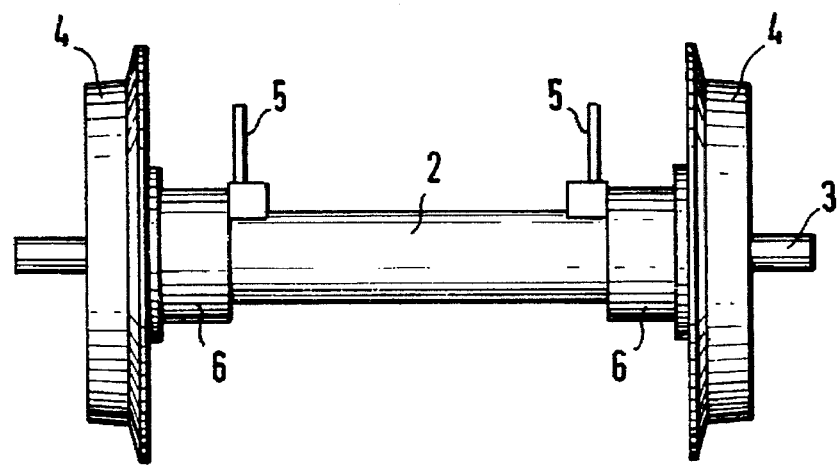
FIG. 1 shows a plan view of the inventive axle.

FIG. 1 shows an axle 1, comprising the axle shaft 2 made from a synthetic material with the integrated, preferably metallic control carrier 3. At the end of the axle shaft 2, the wheel rims 4, which are guided on rails and collect the current, are disposed on ball bearings. Furthermore, the two plug contact pins 5, which will be described in greater detail with respect to FIG. 2 and are in electrically conducting contact with the wheel rims 4, can be seen in FIG. 1. The plug contact pins 5, onto which appropriate counter-connectors are to be slipped for the purpose of contacting to collect for the electric motor, are each held by means of a holding ring 6.

Figure 2:
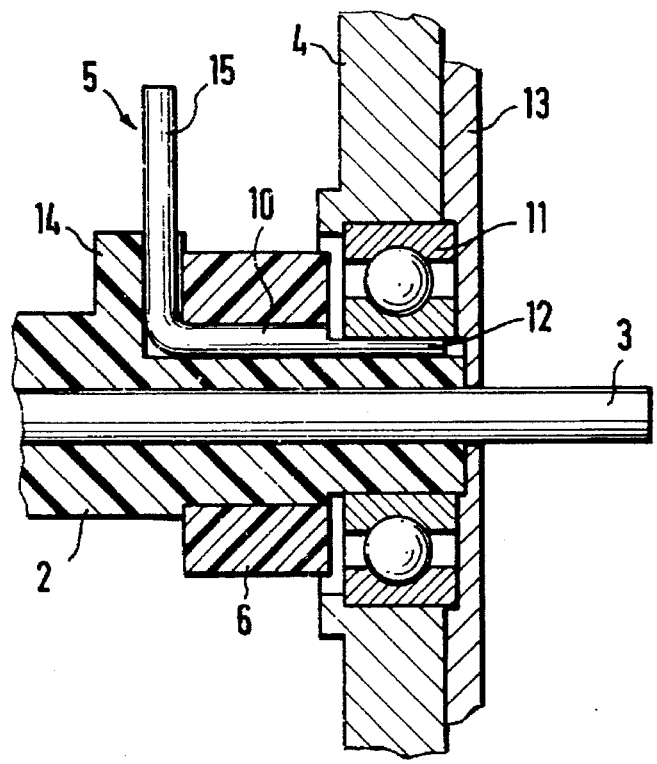
FIG. 2 shows a partially sectional view of the axle of FIG. 1.
Figure 3:
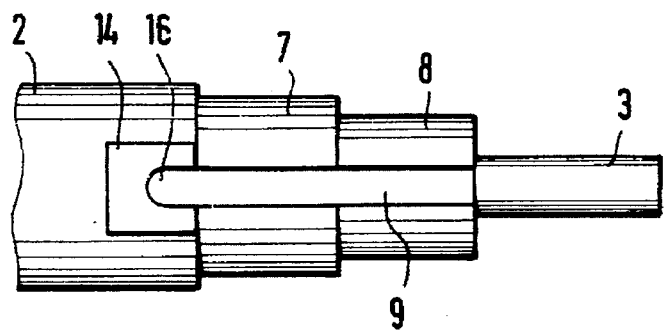
FIG. 3 shows a partially plan view of the axle shaft in the region of the slip-on sections.

Details concerning the plug contact pin as well the device holding it and the contacting can be inferred from the sectional view shown in FIG. 2. The axle shaft 2 has (in this connection, see also FIG. 3) a first slip-on section of diminished diameter 8 and a second slip-on section with a somewhat larger diameter 7. Starting out from the axle shaft region of largest diameter, a groove 9 runs up to the end of the first slip-on section 8, in which the plug contact pin 5 is accommodated, as shown in FIG. 2. For holding the plug contact pin 5, the holding ring 6, the internal diameter of which essentially corresponds to the external diameter of the slip-on section 7 in order to achieve a firm, yet detachable connection, is pushed onto this slip-on section 7. At the same time, the holding ring 6 overlaps the leg 10 of the plug contact pin 5, which runs in the groove 9 parallel to the axis, and wedges it, so that it is held fast in its position. For contacting, the wheel rim 4 with the fitted ball bearing 11 is slipped onto the first slip-on section 8. For achieving an electrical contact with the leg 10 that runs parallel to the axis, the ball bearing 11 positively overlaps the leg 10 at a flattened region 12. To integrate it in the first slip-on section 8 and to achieve the largest possible area of contact with the ball bearing 11, the flattened region 12 is profiled to correspond to the curvature of the slip-on section 8 (and, with that, to the ball bearing lying on it) The wheel rim 4 is closed off laterally by a disk 13 to cover the ball bearing.

When the holding ring 6 or subsequently the wheel rim 4 together with the ball bearing 11 is slipped onto plug contact pin 5, an axial force is acting, to which the plug contact pin 5 would yield by slipping parallel to the axis. Therefore, to prevent slippage, a projection 14 is provided, which acts as an outer support. This projection 14 has a groove 16, which accommodates the radially protruding leg 15 of the plug contact pin 5 and in which this leg 15 is guided, as a result of which, aside from slippage parallel to the axis, turning of the plug contact pin 5 with the leg 10 parallel to the axis as axis of rotation, is prevented. The plug contact pin 5 is thus fixed in its position precisely and securely with respect to the forces acting when the individual parts are slipped on or are pulled off. This is of advantage particularly since the axle 1 can be installed in a position, which is predetermined depending on the application and in which the plug contact pins 5 are aligned in a particular position, so that an installed position can always be selected for the plug contact pins 5, which makes simple contacting possible.

What I claim is:

1. Axle shaft means for an electric toy vehicle operating on a track, said axle shaft means having a receiving section, a bearing means received on said receiving section, a wheel on said bearing means such that said bearing means rotatably supports said wheel on said axle shaft means, and electrical conducting means carried by said axle shaft means, said conducting means having a contact section in contact with said bearing means, said conducting means having another section extending generally radially from said axle shaft means.

2. Axle shaft means according to claim 1 wherein said conducting means has an L-shaped configuration having two leg portions generally perpendicular to one another, one of said leg portions having said contact section which contacts said bearing means, the other leg portion constituting said other section which extends generally radially from said axle shaft means.

3. Axle shaft means according to claim 2 wherein said receiving section on said axle shaft means has support means for supporting said contact section of said conducting means in a position such that said contact section contacts said bearing means.

4. Axle shaft means according to claim 3 wherein said axle shaft means has an axis, said support means comprising a groove in said receiving section, said groove having a groove axis parallel to the axis of said axle shaft means.

5. Axle shaft means according to claim 4 wherein said bearing means has an inner cylindrical surface having an inner cylindrical surface diameter, said receiving section having an outer cylindrical surface having a diameter substantially equal to said inner cylindrical surface diameter, said contact section in said groove in said receiving means having an outer contact surface in contact with said inner cylindrical surface of said bearing means, said bearing means being receivable on said first receiving means while said contact section is disposed in said groove.

6. Axle shaft means according to claim 5 wherein said outer contact surface is a partial cylindrical surface which forms a continuation of said outer cylindrical surface of said receiving section.

7. Axle shaft means according to claim 1 wherein said receiving section on said axle shaft means is designated a first receiving section and said groove in said first receiving section is designated a first groove, said axle shaft means further comprising a second receiving section juxtaposed to said first receiving section, said second receiving section having a second groove, said second groove being a continuation of said first groove and having a groove axis aligned with the groove axis of said first groove.

8. Axle shaft means according to claim 7 wherein said axle shaft means further comprise a ring having an inner cylindrical surface with an inner cylindrical surface diameter, said second receiving section having an outer cylindrical surface with an outer cylindrical surface diameter substantially equal to said inner cylindrical surface diameter, said one leg portion of said L-shaped conducting means having an intermediate section extending between said contact section and said other leg portion, said intermediate section being disposed in said second groove.

9. Axle shaft means according to claim 8 wherein said intermediate section contacts said inner cylindrical surface of said ring.

10. Axle shaft means according to claim 9 wherein said ring is received on said second receiving section with a wedge fit.

11. Axle shaft means according to claim 8 wherein said axle shaft means further comprises a projection juxtaposed to said second receiving section, and support means on said projection for supporting said other leg portion of said L-shaped conducting means.

12. Axle shaft means according to claim 11 wherein said support means comprises a channel having a channel axis perpendicular to the axis of said axle shaft means, said other leg portion of said L-shaped contact means being disposed in said channel.

13. Axle shaft means according to claim 12 wherein said ring has a lateral side facing said channel such that said ring on said second receiving section retains said other leg portion in said channel.

14. Axle shaft means according to claim 12 wherein said projection has an outer side face generally perpendicular to the axis of said axle shaft means and disposed to abut said ring, said channel opening up onto said outer side face of said projection.

15. Axle shaft means according to claim 11 wherein said ring is disposed between said projection and said bearing means.

16. Axle shaft means according to claim 11 wherein said axle shaft means comprises an elongated metal shaft and a synthetic material part disposed about said shaft, said first receiving means, said second receiving means and said projection being integrally formed as said synthetic material part.

17. Axle shaft means according to claim 1 wherein said bearing means comprises ball bearings having an inner race and outer race, said electrical conductive means being in contact with said inner race.

18. Axle shaft means according to claim 1 wherein said conducting means is elastically retained on said axle shaft means.

19. Axle shaft means according to claim 1 further comprising adhesive means for adhering said conducting means to said axle shaft means.

* * * * *